Figure 1:
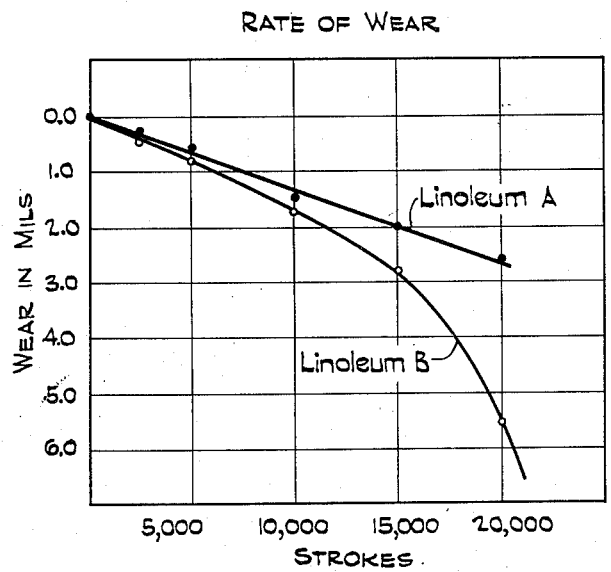

March 26, 1957   J. J. BRADLEY, JR   2,786,773
LINOLEUM CEMENT FROM TALL OIL ESTER, AND
LINOLEUM OBTAINABLE THEREFROM
Filed July 28, 1953

Inventor:
John J. Bradley, Jr.
By James H. Parker
His Attorney

United States Patent Office 2,786,773
Patented Mar. 26, 1957

2,786,773

LINOLEUM CEMENT FROM TALL OIL ESTER, AND LINOLEUM OBTAINABLE THEREFROM

John J. Bradley, Jr., Winchester, Mass., assignor to Shell Development Company, Emeryville, Calif., a corporation of Delaware Application July 28, 1953, Serial No. 370,781

10 Claims. (Cl. 106—123)

This invention relates to new and improved linoleum cements, and to linoleums produced from the cements. More particularly, the invention pertains to cement gels from tall oil esters of glyceryl polyethers of polyhydric phenols for use in the manufacture of linoleum, and to the markedly superior linoleum obtained thereby.

Most linoleum is presently manufactured from a cement prepared from linseed oil and rosin. I have now discovered that linoleums produced from cements comprising gelled tall oil esters of glyceryl polyethers of polyhydric phenol are unexpectedly much superior with respect to wearing qualities, and to resistance against discoloration and deterioration when contacted with cleaning preparations and alkali. My linoleums also have the desirable properties of very smooth surface and good color. In addition, the linoleum compounds containing my cements rapidly cure to the finished linoleum even when the cement gels are obtained from the esters prepared using cheap tall oil as the sole acid constituent.

The cements of my invention are the gelled product obtained by agitating and blowing a tall oil ester of glyceryl polyether of a polyhydric phenol at elevated temperature with an oxygen-containing gas such as air. The esters used in preparing the gelled products are derived from a special class of esterifiable aromatic polyethers. These are esterifiable glyceryl polyethers of polyhydric phenols which contain a plurality of glyceryl groups linked by ethereal oxygen atoms to the aromatic hydrocarbon radical of the polyhydric phenol. The glyceryl polyethers are obtainable by reacting a polyhydric phenol in alkaline solution with epichlorhydrin or dichlorhydrin. A particularly preferred group with distinctive structure is termed esterifiable glyceryl polyethers of dihydric phenols. Such polyethers have a chemical structure wherein the glyceryl radicals from epichlorhydrin or dichlorhydrin, and the divalent aromatic hydrocarbon radicals from the dihydric phenol are present as a chain with the two types of radicals alternating and being joined into the chain by ethereal oxygen atoms. Most of the terminal groups of the chain contain 1,2-epoxy groups owing to the presence of a glycidyl radical thereat although some of the terminal groups may be dihydroxyglyceryl and chlorohydroxyglyceryl radicals.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the dihydric phenol polyether is of resinous character and contains two or more aromatic hydrocarbon radicals alternating with glyceryl groups which are connected therewith through ether oxygen atoms. Ordinarily the polyether is a complex mixture of compounds rather than being a single particular compound. The principal product may be represented by the formula:

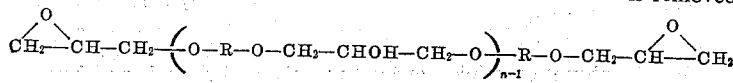

wherein $n$ is a positive whole number (1, 2, 3, etc.) and R represents the divalent radical of the dihydric phenol to which the two phenolic hydroxyl groups are linked directly. While for any single molecule, $n$ is a whole number, the fact that the polyether is a mixture of compounds causes the determined value for $n$, e. g., from molecular weight measurement, to be an average which is not necessarily an integer. Although the polyether is a substance primarily of the above formula, it may contain some material with dihydroxyglyceryl and/or chlorohydroxyglyceryl radicals in place of the glycidyl radical. It is generally preferred to use polyethers wherein $n$ is from about 2 to 4, particularly about 3 although polyethers having $n$ of from 1 to 10 or more may be used if desired. It will be noted from the above formula that the number of divalent aromatic hydrocarbon groups contained in the average molecule of polyether is also indicated by the value of $n$. Thus the polyether obtained by condensation of 2,2-bis(4-hydroxyphenyl)propane with epichlorhydrin and caustic which has a value of 3 for $n$ contains three 2,2-bis(4-phenylene)propane radicals in the average molecule.

The esterifiable groups contained in the polyethers are attached to glyceryl radicals

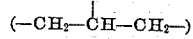

therein. These esterifiable groups are epoxy groups and alcoholic hydroxyl groups, both of which are part of or attached to glyceryl radicals. Upon reaction of the polyethers with the acids of tall oil, both of these esterifiable groups form ester linkages to the glyceryl radicals by joinder thereto of acyloxy groups of the acids.

Any of the various polyhydric phenols are used in preparing the esterifiable polyethers including mononuclear phenols such as resorcinol, hydroquinone, methyl resorcinol, phloroglucinol, pyrogallol, etc.; or complex phenols like 2,2-bis(4-hydroxyphenyl)propane, 4,4'-dihydroxybenzophenone, 1,1-bis(4-hydroxyphenyl)ethane, 2,2-bis(2-hydroxyphenyl)propane, 1,1-bis(4-hydroxyphenyl)isobutane, 2,2-bis(4-hydroxy-2-methylphenyl)butane, 2,2-bis-(2-hydroxy-4-tertiarybutylphenyl)propane, 2,2-bis(2-hydroxynaphthyl)pentane, 1,5-dihydroxynaphthalene, and novolac resins from condensation of a phenol with an aldehyde such as formaldehyde in the presence of an acid catalyst.

The esterifiable polyethers are prepared, in general, by heating the polyhydric phenol with epichlorhydrin at about 50° C. to 200° C. in the presence of sufficient alkali metal hydroxide to combine with the liberated hydrogen chloride. The amount of epichlorhydrin used depends somewhat upon the type of polyhydric phenol employed and the character of the product desired. For production of polyethers of lowest molecular weight ($n$ equal to or approaching 1 in the aforementioned formula), or for production of polyethers from phenols containing three or more phenolic hydroxyl groups per molecule as in pyrogallol or novolac resins, there is used a substantial excess of epichlorhydrin over the stoichiometric amount of one mol of epichlorhydrin per phenolic hydroxyl groups. In this case use of about 3 to 10 mols of epichlorhydrin per phenolic hydroxyl equivalent of polyhydric phenol is employed. The reaction is effected by dissolving the polyhydric phenol in the epichlorhydrin, heating the solution to reaction temperature, and gradually adding about one mol of alkali metal hydroxide per phenolic hydroxyl equivalent of the phenol. Upon completion of the reaction, the unreacted excess epichlorhydrin is removed by distillation and the formed salt is removed by adding benzene to the residue whereupon the polyether dissolves, but the by-product alkali metal chloride salt does not and can be removed by filtration.

Polyethers of different type are preferred for use in the invention. These are derived from a dihydric phenol and are obtained by reacting more than 1 mol up to about 2 mols of epichlorhydrin per mol of dihydric phenol. Also present is an alkali metal hydroxide such as sodium or potassium hydroxide, generally in amount of about 5% to 30% stoichiometric excess of the epichlorhydrin, i. e., about 1.05 to 1.30 mols of base per mol of epichlorhydrin. In effecting the reaction, the dihydric phenol is mixed with an aqueous solution of the base and heated. The epichlorhydrin is then added rapidly to the stirred reaction mass. The initial reaction is exothermic with the result that a temperature rise occurs to some extent. After the initial temperature rise, heating is applied for several hours while stirring in order to complete the reaction. While still in molten condition, the formed polyether is washed with water until free of unreacted base.

The employed mol ratio of epichlorhydrin to dihydric phenol controls the molecular weight of the resulting polyether. The length of the chain of the polyether (value of $n$) is increased by decreasing the mol ratio of epichlorhydrin to dihydric phenol. Thus by decreasing the mols of epichlorhydrin per mol of dihydric phenol from about two downwards toward one, the molecular weight, the softening point and the number of esterifiable groups per average molecule are increased.

The nature of the glyceryl polyethers of polyhydric phenols is better understood by considering preparation and properties of a particular product I prefer to use in my invention. For convenience, this product will be designated as Polyether A.

POLYETHER A

Into a reaction vessel fitted with a stirrer, a mol of 2,2-bis(4-hydroxyphenyl)propane and 1.2 mols of sodium hydroxide as a 10% aqueous solution are introduced and heated to about 45° C. whereupon 1.57 mols of epichlorhydrin are added rapidly. The temperature is then adjusted so that the mixture is heated at about 95° C. to 105° C. for 80 minutes. The mixture separates into a two-phase system and the aqueous phase is decanted. The resulting molten polyether is then washed with boiling water while stirring until neutral to litmus. The resulting product is drained and dehydrated by heating to about 150° C.

The polyether has a softening point of 71° C. by Durrans' mercury method. The molecular weight is about 900 measured ebullioscopically in ethylene dichloride so $n=3$. The esterification value is 0.77 equivalent per 100 grams and the equivalent weight to esterification is 130. The esterification value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours heating. By back titrating the unreacted fatty acid with base, a measure is obtained from which the esterification value may be calculated. The polyether had an epoxy value of 0.210 equivalent per 100 grams.

In like manner, other polyethers of 2,2-bis(4-hydroxyphenyl)propane are prepared which have different molecular weights and values of $n$ depending upon the mol ratio of epichlorhydrin to dihydric phenol used in preparation thereof. This fact is illustrated by the properties of Polyether B listed in the table below. Polyether C of higher molecular weight, like other higher products, is best obtainable by reacting a lower product with less than an equivalent amount of added dihydric phenol. Thus Polyether C is obtained by heating Polyether B to about 150° C., and then adding 5% of 2,2-bis(4-hydroxyphenyl)propane. The heating is continued for about two hours while stirring the reaction mass and gradually increasing the temperature to about 200° C.

| Polyether | Mol Ratio Epichlorhydrin to the Phenol | Mol Ratio NaOH to Epichlorhydrin | Softening Point, °C. | Mol. Wt. | $n$ | Equivalent Weight to Esterification |
|---|---|---|---|---|---|---|
| A | 1.57 | 1.2 | 71 | 900 | 3.0 | 130 |
| B | 1.22 | 1.1 | 100 | 1,400 | 4.7 | 175 |
| C | | | 130 | 2,900 | 10.0 | 190 |

The tall oil esters of the polyethers are prepared by heating and esterifying the polyether with tall oil. For this purpose, any of the various tall oils are suitable. The tall oil in general will contain from about 3 to 70% of resin acids which are usually termed rosin acids. The bulk of the remainder is unsaturated higher fatty acids such as linoleic, oleic and palmitic acids. A small amount of unsaponifiables such as sterols, wax alcohols and terpene hydrocarbons may also be present.

The proportion of tall oil used in esterifying the glyceryl polyether can vary widely. In general, there is used from about 80% to 120% of the theoretical amount of tall oil needed to esterify completely a given polyether although the proportion may be greater or less than this proportion. Thus with a glycerol polyether such as Polyether A having an equivalent weight to esterification of 130 and with a tall oil having an acid number of 188 or acid equivalent weight of 298, the theoretical proportion is 298 parts of tall oil per 130 parts of polyether and there is used from about 238 parts (80%) to 358 parts (120%) of tall oil per 130 parts of polyether. In order that the ester will have an acid number of less than 25 which is desirable, it has been found useful in those cases where about equivalent proportions or more of tall oil is used, to complete the esterification with addition of a polyhydric alcohol such as glycerol, pentaerythritol, dipentaerythritol, sorbitol, polyallyl alcohol and the like. It has also been found useful to effect a mixed esterification by also having present added olefinically unsaturated fatty acid, which acid contains about 12 to 22 carbon atoms and has an iodine value of about 110 to 400. Such fatty acid is ordinarily derived from a natural oil such as linseed oil, soybean oil, dehydrated castor oil, sardine oil, etc. The added fatty acid is used in amount up about an equal weight of the tall oil. With use of the added fatty acid, the aliphatic polyhydric alcohol of at least three hydroxyl groups is also used in such proportion that there is present at least sufficient polyether and alcohol to esterify completely the tall oil and added fatty acid and preferably about a 5% to 30% excess is used. Also, if desired, mixtures of two or more different tall oils may be used in preparing the esters. Typical formulations for such mixed tall oil esters will be described hereinafter.

The esterification is effected at about 150° F. to 580° F. in a vessel fitted with a stirrer and with means to keep the reactants and product out of contact with the oxygen in air. The glyceryl polyether of a polyhydric phenol and the tall oil are charged to the reaction vessel, along with drying oil fatty acid, if used, and the mixture is heated under a slow flow of inert gas such as carbon dioxide or nitrogen until the mixture melts. While heating and stirring up to about 400 to 450° F., the fluid esterifying mixture is bubbled with the inert gas. Any polyhydric alcohol needed is then added and the esterification operation completed while bubbling in inert gas by heating up to and at about 500 to 580° F., with reduction of the acid number to about 20 or less, preferably below 10.

The invention thus contemplates use of a tall oil polyester of an esterifiable glyceryl polyether of a polyhydric phenol containing at least two glyceryl radicals and having at least three acyloxy groups of the tall oil joined to the glyceryl radicals, any unsatisfied valences of the glyceryl radicals being attached and taken up by linkage to ether oxygen atoms, alcohol hydroxyl groups and chlorine atoms since the esterification with the tall oil first destroys the epoxy groups in the polyether and then the alcoholic hydroxyl groups are esterified. More particularly there is used a tall oil polyester of an esterifiable glyceryl polyether of a dihydric phenol having alternating glyceryl radicals and the aromatic hydrocarbon radicals of the phenol (the hydrocarbon radical to which the two phenolic hydroxyl groups were linked directly in the dihydric phenol) united in a chain by ether oxygen atoms, which polyether contains terminal glyceryl radicals and about 2 to 10 of the aromatic radicals in the chain, and which polyester preferably has at least five acyloxy groups of the tall oil joined to the glyceryl radicals. When an aliphatic polyhydric alcohol is also used in preparing the ester, the product is a tall oil mixed polyester of an aliphatic polyhydric alcohol and an esterifiable glyceryl polyether of a dihydric phenol having alternating glyceryl radicals and the aromatic hydrocarbon radicals of the phenol united in a chain by ether oxygen atoms with glyceryl radicals in terminal positions and with an average of about 2 to 10 of the aromatic hydrocarbon radicals in the chain, which polyester is obtained from esterification of an equivalent amount (one acid equivalent weight) of the tall oil with, preferably, about 1.05 to 1.3 of an equivalent proportion (equivalent to complete esterification with the equivalent amount of the tall oil) of the polyether and the polyhydric alcohol wherein the portion of the alcohol constitutes up to about one-half of said equivalent proportion, and which polyester has an acid number of less than 25. The preferred material for preparation of the gel is mixed tall oil and natural fatty acid polyester of an aliphatic polyhydric alcohol (such as pentaerythritol) and an esterifiable glyceryl polyether of a dihydric phenol having alternating glyceryl radicals and the aromatic hydrocarbon radicals of the phenol united in a chain by ether oxygen atoms with glyceryl radicals in terminal position and preferably having an average of about 2 to 4 of the aromatic hydrocarbon radicals in the chain, which polyester is obtained from esterification of an equivalent amount of tall oil and added natural oil fatty acid, said fatty acid constituting up to about one-half of said equivalent amount, with about 1.05 to 1.3 equivalent proportions of the polyether and the polyhydric alcohol wherein the latter constitutes up to about three-quarters in equivalency of said equivalent proportion, the natural oil fatty acid containing about 12 to 22 carbon atoms and having an iodine value of about 100 to 400, and which polyester preferably has an acid number of less than 10.

The novel gel is formed from the tall oil ester by stirring and blowing with gas containing molecular oxygen such as air at a temperature of about 150 to 250° F. It is convenient to effect the gelation in a Bedford Smacker and to have present about 0.3 to 2% of litharge as catalyst. The blowing is continued for about 3 to 24 or more hours until a stiff gel is obtained. The gel is a rubbery thermoplastic product.

It appears that best results are obtained in the blowing operation with use of temperatures of about 170 to 230° F., a temperature of about 185° F. being particularly suitable. In effecting the blowing, use of a distributing device with formation of finely divided bubbles of the oxygen-containing gas is helpful. Although air is normally used as a matter of economy, oxygen or oxygen diluted with inert gas or gases such as carbon dioxide, methane, or the like may be used if desired.

After being formed, the gel is discharged from the reactor and is normally aged for about 1 to 4 weeks at atmospheric temperature of about 50 to 100° F. The resulting cement gel is then ready for manufacture of linoleum therefrom.

The improved linoleum of the invention is prepared by mixing the cement gel with wood flour, cork, mineral filler, pigment and drier such as manganese resinate and/or cobalt naphthenate, and then calendering the mixture into sheets after which final cure may, if required, be effected by stoving at moderate temperature. The mixing of the gel with the other ingredients is normally effected on a roll mill. Various other types of mixers may be used as desired such as Banbury mixers and scratch rolls. Thorough and substantially homogeneous mixing is needed. An outstanding advantage of the cements of the invention is their property of wetting wood flour and pigments with the result that milling time is reduced as much as 30% over conventional linseed oil-rosin cements.

The cement gel is used in amount so that the mixture contains about 20 to 40% by weight, the remainder being about equal parts of wood flour and whiting (powdered calcium carbonate) along with a small amount of coloring pigment. Also present is about 0.0025 to 0.4% of drier such as manganese resinate (6% Mn). The optimum amount of drier is dependent upon the curing temperature; at higher curing temperatures, less drier is needed. In general, a lower amount of drier is required than with the conventional cements. The mixture of linoleum compound is then sheeted out on a calender. In this operation, it may be calendered onto a cloth mounting material such as burlap or on an asphalt saturated felt base for added strength of the resulting linoleum.

In order to effect final cure, the linoleum sheets are festooned or laid in flat racks so air can circulate therebetween in a stoving oven. It was found that even though the cement was prepared from tall oil, cure was obtained in relatively short periods of time. The cure is effected at a temperature of about 120 to 180° F. It is useful to subject the sheets to an initial treatment of about 6 to 10 hours at about 120° F. and then increase the temperature for completion of the cure.

The resulting linoleum which is usually sheeted to about 0.025 to 0.25 inch thickness and contains about 20 to 40% cured binder comprising the cured gel of the tall oil ester of the glyceryl polyether of a polyhydric phenol, are characterized by unusual wearing qualities, resistance against deterioration and discoloration when contacted with aqueous caustic or washing solutions, exceptionally smooth surfaces, good color and color retention.

The following examples are given for the purpose of illustrating the invention, but its scope is not to be construed as limited to details described therein. The parts and percentages are by weight.

*Example 1*

This example will demonstrate the unexpectedly superior properties of the linoleum of the invention as compared to those of corresponding conventional linoleum made from a linseed oil-rosin cement.

A mixture of 585 parts of Polyether A, 1269 parts of tall oil containing 44% rosin acids and having an acid number of 164 (Unitol R, Union Bag Co.), and 1134 parts of distilled linseed oil fatty acid was charged to a vessel equipped with a stirrer and inert gas inlet for blowing with carbon dioxide. The mixture was heated under a slow flow of gas to 185° F. and the stirrer started. Heating was continued to about 425° F. whereupon about 162 parts of commercial pentaerythritol (Pentek, Heyden Chemical Co.) having an equivalent weight to esterification of 37.5 was added with increased stirring. The gas was turned to medium flow and the batch was heated at about 525° F. for 7 hours, the acid number having dropped to 10. The heating was discontinued and the batch allowed to cool to about 180° F. About 24 parts of powdered litharge was added, and the batch was blown with air at about 185° F. at a rate of 0.05 cubic foot per minute per pound of ester until a stiff gel was obtained which took about 12 hours. The resulting gel was discharged and allowed to age at about 70° F. for two weeks.

For the comparison, a top quality commercial cement made from about 23% rosin and 77% linseed oil was used.

Linoleum mix was made from each of the cements by milling on a two roll mill, and calendered by one pass through 30% slip rolls. The linoleum sheets were about 0.05 inch thick. The ingredients used were as follows:

| | Parts |
|---|---|
| Cement | 97 |
| Drier (manganese resinate, 6% Mn) | 0.0155 |
| Titanium dioxide pigment | 13 |
| Whiting | 100 |
| Wood flour | 113 |

Both of the mixes sheeted at 0.05 inch thickness without sticking and the sheet from the tall oil ester cement was much smoother than the other. The sheets were cured in an oven for 8 hours at 120° F., 24 hours at 160° F., and then at 180° F. until the indentation test of Government specification methods were passed, the dent being 0.012 inch with a 0.282 inch diameter flat cylindrical steel bar under 80 pounds applied for 60 seconds. To attain this indentation hardness, the linoleum from the tall oil ester required 7 days' cure, and the other from the conventional cement required 8 days. Hereinafter this linoleum from the tall oil ester will be designated as Linoleum A and the conventional linoleum as Linoleum B.

The dry abrasion, which is a measure of wearing qualities, was determined with a modified Gardner washing machine. The brush of the machine was replaced with a metal block, the lower surface of which was covered with 00 gauge emery cloth. The cloth was cleaned after every 500 strokes. The wear was determined by decrease in caliper or thickness. The results are tabulated below.

| Linoleum | Caliper in Mils | | Wear in Mils | |
|---|---|---|---|---|
| | A | B | A | B |
| Strokes: | | | | |
| Start | 47.0 | 46.7 | | |
| 2,000 | 46.8 | 46.3 | 0.2 | 0.4 |
| 5,000 | 46.4 | 45.9 | 0.6 | 0.8 |
| 10,000 | 45.6 | 45.0 | 1.4 | 1.7 |
| 15,000 | 45.0 | 43.8 | 2.0 | 2.9 |
| 20,000 | 44.5 | 41.2 | 2.5 | 5.5 |

The resistance of the linoleums to dilute aqueous alkali was determined as a measure of the action of washing compounds. The test was performed by applying a 5% aqueous solution of sodium hydroxide to a spot on the surface. The loss in caliper due to the action of the alkali was measured with the following results.

| Linoleum | Loss in Mils | |
|---|---|---|
| | A | B |
| Minutes of contact: | | |
| 5 | 0.2 | 4.2 |
| 10 | 1.0 | 7.0 |
| 20 | 1.5 | 9.4 |
| 30 | 2.2 | 11.7 |

Figure 2:
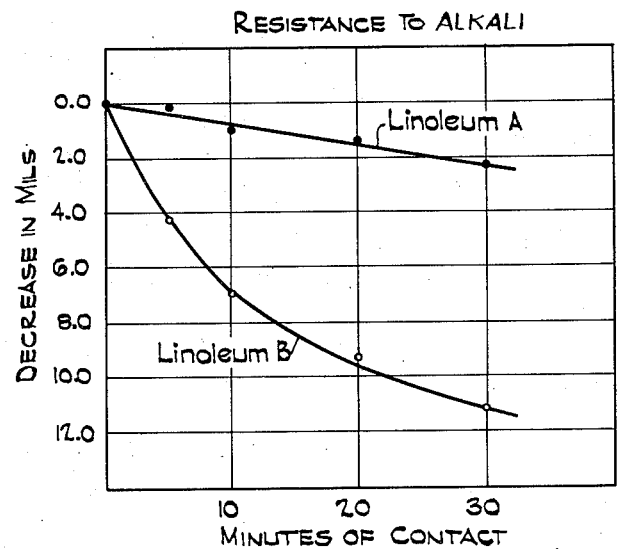

The marked superiority in wearing qualities and alkali resistance of Linoleum A of the invention as compared to conventional Linoleum B is more evident from the accompanying drawing wherein Fig. 1 is a graphical plot of the wear and Fig. 2 is a plot of the decrease in thickness when contacted with the dilute alkali.

It is to be observed from Fig. 1 that the wear of Linoleum A was substantially uniform during the whole test, but that the wear of Linoleum B was faster in the early stages and then rapidly increased during the last stage of the test.

Fig. 2 likewise shows that the loss in thickness of Linoleum A when contacted with the dilute caustic was small and substantially uniform. On the other hand, Linoleum B suffered a large decrease in thickness which was very rapid throughout the test period.

The linoleums were also subjected to test using the Gardner washing machine with a 1% aqueous solution of Tide (Proctor-Gamble Co.), a synthetic detergent which contains sodium propylene tetramer benzene sulfonate heavily loaded with more than 50% of sodium phosphates. Linoleum B softened and discolored badly to a brown color after only 10 minutes action of the brush, and the brown discoloration had spread over the entire surface of the specimen after 20,000 strokes. Linoleum A showed only a slight stain in the corresponding test.

*Example 2*

There were charged to a vessel fitted with a stirrer and carbon dioxide sparger 340 parts of tall oil (Unitol R, Union Bag Co.) with acid number of 165 which contained 42.6% rosin acids and 193 parts of Polyether B. The mixture was heated under a slow flow of gas to about 185° F. and the stirrer was started with increase in temperature to about 485° F. where it was held until the acid number of the mixture decreased to below 6. The tall oil ester was then cooled to about 180° F. and 1.8 parts of litharge was added, and the batch was blown with air at a rate of 0.05 cubic foot per minute per pound of ester. The blowing required only 4 hours to convert the ester to a stiff gel. The gel was discharged and aged for two weeks.

A linoleum mix was prepared from the cement using 99 parts of gel, 0.04 part of manganese resinate drier, 100 parts of wood flour, 118 parts of whiting and 13 parts of titanium oxide pigment according to the procedure described in Example 1 except that it was sheeted to a thickness of 85 mils. The sheet was cured for 5 days according to the conditions described in Example 1.

The resulting linoleum had a very smooth surface of light color. It will be designated as Linoleum C.

Another gel was prepared as described above except that 297 parts of a tall oil (Aconew, Arizona Chemical Co.) having an acid number of 187 and containing only 8% rosin acids was used. The air blowing required only 3½ hours to obtain the gel of the tall oil ester. A linoleum mix of the above-described composition was prepared from the cement gel. Curing of the sheet of 5 mils thickness again required 5 days.

The resulting linoleum was flexible with a smooth surface and good color. The linoleum will be designated as Linoleum D.

For the purpose of comparison a conventional cement was similarly prepared from a mixture of about 23% rosin and 77% linseed oil. Air blowing for 14 hours was required to convert the mixture to a gel. A linoleum mix of the composition described above was prepared. Curing of the sheet required 9 days. This conventional linoleum will be designated as Linoleum E.

The three linoleums were subjected to standard linoleum tests with the following results:

| Linoleum | Mandrel,[1] in. dia. | Dent,[2] mils. | Alkali Resistance,[3] 1% NaOH | Washing,[4] 1% soap | Dry Abrasion,[5] mils. |
|---|---|---|---|---|---|
| C | 2¼ | 15 | 180 | 30,000 | 0.6 |
| D | 1½ | 16 | 180 | 30,000 | 0.9 |
| E | 2¼ | 24 | 3 | 3,000 | 1.6 |

[1] Minimum diameter of mandrel used in bending one inch strip 180° without cracking.
[2] Depth of dent after aging 1 week with 0.282 inch diameter pin using 80 pound weight for 60 seconds.
[3] Time in minutes to soften surface with 1% aqueous sodium hydroxide solution.
[4] Number of rubs on Gardner washing machine using 1% aqueous Ivory soap solution.
[5] Loss of thickness after 30,000 strokes with 00 gauge emery cloth.

The results shown in the above table again demonstrate the unexpectedly superior properties of the linoleum of the invention over conventional linoleum.

*Example 3*

Some 2400 parts of tall oil (Acinitol FA-1, Arizona Chemical Co.) having an acid number of 188 and containing 4% rosin acids, and 920 parts of Polyether A were charged to a vessel fitted with a stirrer and carbon dioxide sparger. The mixture was heated to about 185° F. with a slow flow of gas and then the stirrer was started. Heating was continued to about 425° F. whereupon 63 parts of technical pentaerythritol (Pentek, Heyden Chemical Co.) having an equivalent weight to esterification of 37.5 was added. The temperature was increased to about 525° F. and maintained there until the acid number was 20. The temperature was then allowed to drop to about 180° F. and 19.2 parts of litharge was added. Air was blown through the batch at a rate of about 0.05 cubic foot per minute per pound of ester at a temperature of about 180° F. The ester was thereby converted to a stiff gel in 11 hours' blowing time. The gel was aged for two weeks.

A linoleum mix was prepared from the gel using 85 parts of gel, 0.10 part of manganese resinate, 100 parts of wood flour, 118 parts of whiting and 13 parts of titanium dioxide pigment according to the procedure described in Example 1, and then the sheet was cured as in the same example for 6 days.

The resulting linoleum was characterized by excellent flexibility, light color and a very smooth surface.

*Example 4*

A number of linoleums were prepared from the tall oil ester gel or cement containing 0.15% manganese resinate drier described in Example 1 using various fillers and colored pigments. The same procedure given in Example 1 was used for their preparation. In all cases, 7 days of cure was required. The composition of the linoleums in parts by weight is tabulated below.

| Linoleum | F | G | H | I |
|---|---|---|---|---|
| Cement | 118 | 86 | 103 | 103 |
| Wood flour | 127 | 121 | 121 | 121 |
| Whiting | 125 | 113 | 113 | 113 |
| Red Lake | 3 | | | |
| Chrome Orange | | 5 | | |
| Lithol Toner | | 0.5 | | |
| Red Oxide R-2100 | | | 7 | |
| $TiO_2$ | | | | 1 |
| Red Oxide RO-5097 | | | | 7 |
| Percent Binder | 33 | 26 | 30 | 30 |

The foregoing linoleums were again characterized by good color and very smooth surfaces.

*Example 5*

An ester was prepared from two different tall oils. A mixture of 800 parts of a tall oil containing 3.5% rosin acids and having an acid number of 188 (Acinitol FA-1, Arizona Chemical Co.), 680 parts of another tall oil containing 45% rosin acids and having an acid number of 165 (Facoil CB, National Southern Products Corp.), 250 parts of distilled linseed oil fatty acid, and 260 parts of Polyether A was charged to a closed kettle provided with an agitator, condenser, and carbon dioxide inlet. The mixture was heated under a slow flow of gas to about 300° F. and the stirrer was started. Heating was continued to about 355° F. whereupon 152 parts of commercial pentaerythritol (Pentek, Heyden Chemical Co.) was added. Stirring was continued with heating at medium gas flow for about 15 minutes. Then the temperature was increased to about 500° F. and the reaction was continued for about 7 hours until the acid number was reduced to 10. The batch was allowed to cool to approximately 390° F. under a slow gas flow, and then about 7.2 parts of litharge and 0.8 part of manganese resinate (6% Mn) were added. The mixture was stirred for about 15 minutes at 390° F. The batch was next blown with air at about 185° F. at a rate of 0.05 cubic foot per minute per pound of ester for 9 hours whereby a stiff gel was formed.

Using the gel as cement, a linoleum mix was prepared containing 291 parts of the gel, 39 parts of titanium dioxide pigment, 300 parts of whiting and 339 parts of wood flour according to the procedure described in Example 1. The mix was sheeted to a thickness of about 50 mils and was cured at 120 to 180° F. for six days. The formation of the sheeting was good, and the cured linoleum had very good smoothness and color. The linoleum passed the 1½ inch mandrel test for flexibility, and lost only 2.5 mils thickness upon being contacted with 5% aqueous sodium hydroxide solution for 30 minutes in the alkali resistance test.

I claim as my invention:

1. A cement comprising a gel of a tall oil polyester of an esterifiable glyceryl polyether of a polyhydric phenol containing at least two glyceryl radicals and having at least three acyloxy groups of the tall oil acid joined to said glyceryl radicals, which gel is obtained by agitating and blowing the ester with a gas containing molecular oxygen at an elevated temperature.

2. A linoleum having as binder a cured cement as defined by claim 1.

3. A cement comprising a gel of a tall oil polyester of an esterifiable glyceryl polyether of a dihydric phenol having alternating glyceryl radicals and the aromatic hydrocarbon radicals of the phenol united in a chain by ether oxygen atoms, which polyether contains terminal glyceryl radicals and an average of about 2 to 10 of the aromatic hydrocarbon radicals in the chain, which polyester has at least three acyloxy groups of the tall oil acid joined to the glyceryl radicals, and which gel is obtained by agitating and blowing the ester with a gas containing molecular oxygen at from about 150 to 250° F.

4. A linoleum having as binder a cured cement as defined by claim 3.

5. A cement comprising a gel of a tall oil polyester of an esterifiable glyceryl polyether of 2,2-bis(4-hydroxyphenyl)propane having alternating glyceryl and 2,2-bis(4-phenylene)propane radicals united in a chain containing terminal glyceryl radicals and an average of about 2 to 4 of the 2,2-bis(4-phenylene)propane radicals in the chain, which polyester has at least three acyloxy groups of the tall oil acid joined to the glyceryl radicals, and which gel is obtained by agitating and blowing the ester with air at from about 150 to 250° F.

6. A linoleum comprising a sheet of a homogeneous mixture of wood flour, whiting, pigment and binder, the binder constituting about 20 to 40% by weight of the mixture and being the cured product of the cement defined by claim 5.

7. A cement comprising gel of a tall oil mixed polyester of an aliphatic polyhydric alcohol and an esterifiable glyceryl polyether of a dihydric phenol having alternating glyceryl radicals and the aromatic hydrocarbon radicals of the phenol united in a chain by ether oxygen atoms with glyceryl radicals in terminal position and having about 2 to 10 of the aromatic hydrocarbon radicals in the chain, which polyester is obtained from esterification of an equivalent amount of the tall oil with about 1.05 to 1.30 of an equivalent proportion of the polyether and the polyhydric alcohol wherein the alcohol constitutes up to about one-half of said equivalent proportion, and which polyester has an acid number of less than 25, and which gel is obtained by agitating and blowing said polyester with air at from about 150 to 250° F.

8. A linoleum having as binder cured product of the cement defined by claim 7.

9. A cement comprising gel of a mixed tall oil and linseed oil fatty acid polyester of pentaerythritol and an esterifiable glyceryl polyether of 2,2-bis-(4-hydroxyphenyl)propane having alternating glyceryl radicals and 2,2-bis(4-phenylene)propane radicals united in a chain by ether oxygen atoms with glyceryl radicals in terminal position and having an average of about 2 to 4 of the 2,2-bis(4-phenylene)propane radicals in the chain, which polyester is obtained from esterification of an equivalent amount of tall oil and linseed oil fatty acid, said fatty acid constituting up to about one-half of said equivalent proportion of the polyether and pentaerythritol wherein the latter constitutes up to about three-quarters of said equivalent proportion and which polyester has an acid number of less than 10, and which gel is obtained by agitating and blowing the polyester with air at about 170 to 200° F.

10. A linoleum comprising a sheet of homogeneous mixture of wood flour, whiting, pigment and binder, the binder constituting about 25 to 35% by weight of the mixture and being the cured product of the cement defined by claim 9.

References Cited in the file of this patent

UNITED STATES PATENTS

| | | |
|---|---|---|
| 2,235,507 | Strauch | Mar. 18, 1941 |
| 2,420,694 | Barthel | May 20, 1947 |
| 2,528,933 | Wiles | Nov. 7, 1950 |
| 2,539,975 | Spitzer | Jan. 30, 1951 |

FOREIGN PATENTS

| | | |
|---|---|---|
| 480,456 | Canada | Jan. 22, 1952 |